Dec. 1, 1925.
F. AYLER
DIRECTION INDICATOR
Filed April 18, 1922   2 Sheets—Sheet 2
1,564,118
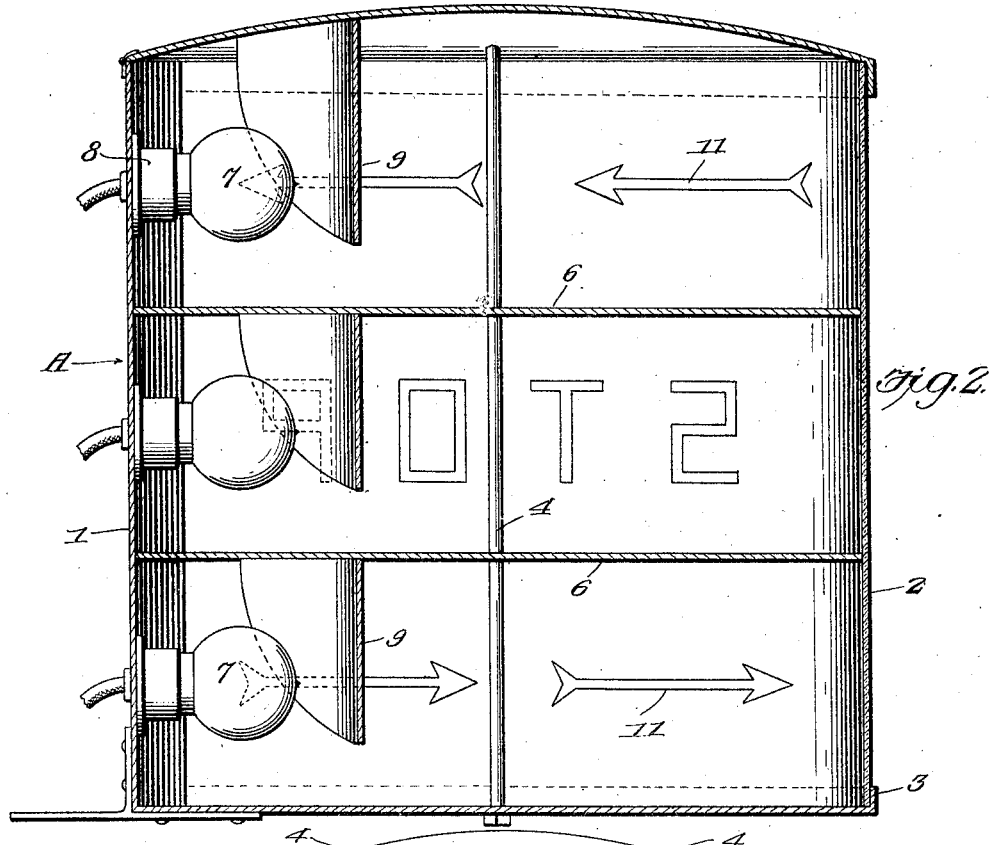
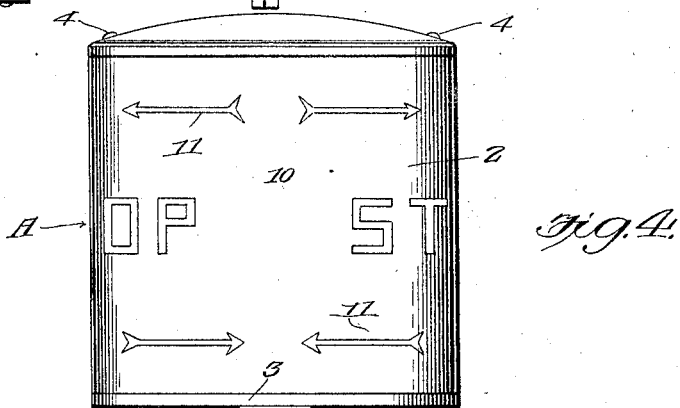

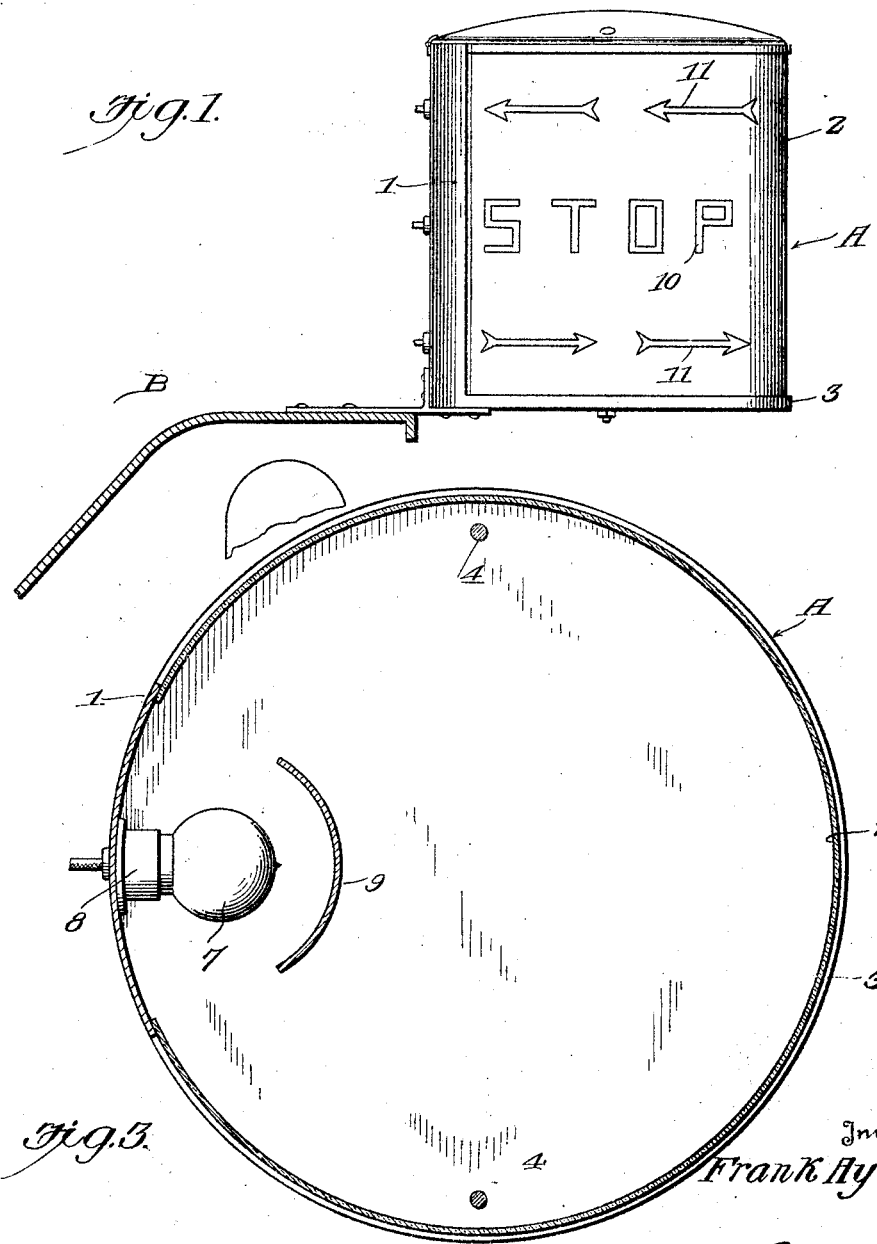

Patented Dec. 1, 1925.

1,564,118

UNITED STATES PATENT OFFICE.

FRANK AYLER, OF TACOMA, WASHINGTON.

DIRECTION INDICATOR.

Application filed April 18, 1922. Serial No. 554,373.

*To all whom it may concern:*

Be it known that I, FRANK AYLER, a citizen of the United States, residing at Tacoma, in the county of Pierce and State of Washington, have invented new and useful Improvements in Direction Indicators, of which the following is a specification.

This invention relates to a directional indicator for motor vehicles, the general object of the invention being to provide a series of signals, each of which includes a lamp for indicating when the vehicle is to stop or make a turn to either the right or left.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view showing the invention in use.

Figure 2 is an enlarged view of the device itself.

Figure 3 is a cross section of the device.

Figure 4 is a view taken at right angles to Figure 1.

As shown in these views the indicator A is attached to the fender B of the motor vehicle, though it will of course be understood that it may be attached to any desired part of the vehicle at either the front or rear or both front and rear signals may be used. The device comprises a casing 1 which is preferably of cylindrical shape and having its major part formed of transparent material, as shown at 2. This material is preferably glass. The bottom and top of the casing are each provided with a flange 3 which engages the cylindrical part and the parts are held in assembled position by the bolts 4.

Partitions 6 divide the casing into three compartments and an electric lamp 7 is arranged in each compartment, the sockets 8 for the lamps being connected with the rear part of the casing. A deflector 9 is arranged in each compartment in front of the lamp for diffusing the rays of light therefrom. The transparent member has arranged thereon in any suitable manner the letters 10 forming the words "stop", these words being at the center so that they will be illuminated when the lamp in the center compartment is ignited. Arrows 11 are arranged at the top and bottom of the transparent member, these arrows being illuminated by the lamps in the end compartments and said arrows point in different directions so as to indicate that the vehicle is either to turn to the right or to the left. It will be seen that the words and arrows are so arranged that they can be seen from different points so that pedestrians or drivers of other vehicles can readily tell which direction the vehicle is to turn. The circuits of the lamps can be controlled in any suitable manner from a point adjacent the driver's seat so that the driver can turn on the current to the desired lamp to indicate that he is to stop or that he is to turn to either the right or the left.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A direction indicator comprising a vertically arranged transversely bowed wall, an annular rim connected with the lower end thereof, a top wall provided with an annular rim which is disposed in parallel relation to the first mentioned annular rim and a bottom wall carried by the lower rim, a split cylindrical transparent member arranged between the bottom and top walls and having its ends received in the rims, and the vertical edges of the transparent member being disposed behind the opposite vertical edges of the transversely bowed wall, and vertically arranged bolts passing through the top and bottom walls whereby to hold the parts assembled, the transparent wall being provided with indicia and illuminating means carried by the transversely bowed wall for illuminating the indicia.

In testimony whereof I affix my signature.

FRANK AYLER.